United States Patent
Nam et al.

(10) Patent No.: US 10,696,152 B2
(45) Date of Patent: Jun. 30, 2020

(54) HEAT EXCHANGER COOLING SYSTEM

(71) Applicants: Hyundai Motor Company, Seoul (KR); Kia Motors Corporation, Seoul (KR)

(72) Inventors: Jong-Woo Nam, Seoul (KR); Kyu-Kwon Bang, Suwon-si (KR); Min-Soo Oh, Suwon-si (KR); Won-Sik Kim, Suwon-si (KR); Seung-Jin Kang, Seoul (KR); Dong-Guk Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 254 days.

(21) Appl. No.: 15/831,082

(22) Filed: Dec. 4, 2017

(65) Prior Publication Data

US 2018/0170170 A1      Jun. 21, 2018

(30) Foreign Application Priority Data

Dec. 16, 2016  (KR) .......................... 10-2016-0172777

(51) Int. Cl.
*B60K 11/08*   (2006.01)
*B60K 11/06*   (2006.01)

(52) U.S. Cl.
CPC ............ *B60K 11/085* (2013.01); *B60K 11/06* (2013.01); *Y02T 10/88* (2013.01)

(58) Field of Classification Search
CPC ........ B60K 11/085; B60K 11/06; Y02T 10/88
See application file for complete search history.

(56) References Cited

U.S. PATENT DOCUMENTS

| 8,365,854 | B2 * | 2/2013 | Lee ......................... | B60K 11/00 180/68.1 |
| 8,544,581 | B2 * | 10/2013 | Stokes ..................... | B60R 19/48 180/68.1 |
| 9,168,827 | B2 | 10/2015 | Povinelli | |
| 9,975,420 | B2 * | 5/2018 | Boom ................... | B60K 11/085 |
| 10,166,858 | B2 * | 1/2019 | Ibanez Moreira ...... | F16H 37/12 |
| 2010/0243352 | A1 * | 9/2010 | Watanabe ............. | B60K 11/085 180/68.1 |
| 2011/0048691 | A1 * | 3/2011 | Shin ......................... | F01P 7/12 165/299 |
| 2011/0226541 | A1 * | 9/2011 | Hori ..................... | B60K 11/085 180/68.1 |
| 2012/0132474 | A1 * | 5/2012 | Charnesky ........... | B60K 11/085 180/68.1 |

(Continued)

FOREIGN PATENT DOCUMENTS

| JP | 2007-8190 A | 1/2007 |
| JP | 2014-88798 A | 5/2014 |
| KR | 10-1180220 B1 | 8/2012 |

*Primary Examiner* — Joseph J Dallo
*Assistant Examiner* — Kurt Philip Liethen
(74) *Attorney, Agent, or Firm* — Morgan, Lewis & Bockius LLP

(57) ABSTRACT

A heat exchanger cooling system may include a frame provided in a duct housing and formed of two sections, each of the two sections being divided into two sub-sections, a single motor provided in the frame, and a drive device configured to be driven by the single motor, wherein air flaps provided in the respective sub-sections are simultaneously controlled by operation of the drive device.

18 Claims, 22 Drawing Sheets

(56) References Cited

U.S. PATENT DOCUMENTS

2013/0146375 A1\* 6/2013 Lee ............................ F01P 7/10
  180/68.1
2017/0050509 A1\* 2/2017 Aizawa ................ B60K 11/085

\* cited by examiner

HEAT EXCHANGER COOLING SYSTEM

CROSS-REFERENCE(S) TO RELATED APPLICATIONS

The present application claims priority to Korean Patent Application No. 10-2016-0172777, filed on Dec. 16, 2016, the entire contents of which is incorporated herein for all purposes by this reference.

BACKGROUND OF THE INVENTION

Field of the Invention

The present invention relates to a heat exchanger cooling system; and, more particularly, to a heat exchanger cooling system in which a duct housing is partitioned into two sections each of which is divided into two sub-sections, and which is configured for driving air flaps for the respective sections using only one motor, thus minimizing production costs and weight of the system.

Description of Related Art

Generally, a vehicle has in an engine compartment thereof not only an member including an engine for driving the vehicle but also various types of heat exchangers including a radiator, an intercooler, an evaporator, and a condenser for cooling portions of the vehicle or air-conditioning the temperature of air in a passenger compartment.

Such heat exchangers typically have a heat exchange medium circulating therein and perform a cooling or heat-dissipation function by heat exchange between the heat exchange medium and external air. To reliably operate the various heat exchangers in the engine compartment of the vehicle, the external air must be smoothly supplied into the engine compartment.

Typically, a vehicle has an active air flap, which is provided between heat exchanger and an opening formed in the front of the vehicle to control the flow rate of air supplied into the opening, wherein when the vehicle moves, the flow rate of air supplied into the opening is increased.

As shown in FIG. 1, in the case where an active air flap device 1 is disposed in either an upper portion of a duct housing or a lower portion therein, the entire system is simple, and there are advantages in terms of fail-safe performance because a constant cooling area is secured in a portion in which the active air flap is not provided. However, since the active air flap device is disposed in only either the upper portion or the lower portion, a blockage ratio is relatively low wherein improvement in aerodynamic performance and fuel efficiency is limited.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects and exemplary embodiments of the present invention are directed to providing a heat exchanger cooling system in which a duct housing is partitioned into two sections each of which is divided into two sub-sections, and which is configured for driving air flaps for the respective sections using only one motor, minimizing the production cost and weight of the system, and meeting various requirements including improvement in aerodynamic performance and fuel efficiency.

Other objects and advantages of the present invention can be understood by the following description, and become apparent with reference to the exemplary embodiments of the present invention. Also, it is obvious to those skilled in the art to which the present invention pertains that the objects and advantages of the present invention can be realized by the means as claimed and combinations thereof.

In accordance with various exemplary embodiments of the present invention, there is provided a heat exchanger cooling system including: a frame provided in a duct housing and formed of two sections, each of the two sections being divided into two sub-sections; a single motor provided in the frame; and a drive device configured to be driven by the single motor, wherein air flaps provided in the respective sub-sections are simultaneously controlled by operation of the drive device.

The drive device may include: rotators configured to be rotated by the motor; gears each of which having a coupling hole at a predetermined position wherein each gear is allowed to be rotated when a corresponding one of coupling protrusions provided on respective opposite surfaces of each of the rotators engages with the coupling hole of the gear; and a lever coupled to each of the gears.

Each of the gears may have four surfaces, and each of the four surfaces may be formed of a concave curved surface.

The lever may be coupled to a corresponding one of the air flaps of the respective sub-sections.

A spring fixed at one end portion thereof to the duct housing may be coupled to a lower end portion of at least one of the levers coupled to the respective lower air flaps.

The two sections may include two upper and lower sections.

A stopper having a ¾ circular cross-section may protrude from a first surface of each of the rotators of the drive device, and a stopper having a ¼ circular cross-section may protrude from a second surface of the rotator.

The coupling protrusions provided on the opposite surfaces of each of the rotators may have different phases.

One of the coupling protrusions may be provided on the first surface of the rotator, and two of the coupling protrusions may be provided on the second surface of the rotator with a phase difference of 180° therebetween.

Two of the levers that extend into an upper section of the two sections may be provided externally to the rotators, and two of the levers that extend into a lower section of the two sections may be provided internally to the rotators.

The two sections may include a first section formed on a right side, and a second section formed on a left side, wherein the first and second sections may have areas corresponding to each other.

Coupling protrusions and stoppers provided on each of the rotators may be disposed on the opposite surfaces of the rotator at positions corresponding to each other.

Two coupling protrusions having a phase difference of 180° relative to each other and a stopper having a ¼ circular cross-section may protrude from a first surface of the rotator that pertains to the second section, wherein the stopper may have a difference in phase of 45° relative to each of the two coupling protrusions.

One coupling protrusion and a stopper having a ¾ circular cross-section may protrude from a first surface of the rotator that pertains to the first section, wherein the stopper may have a difference in phase of 45° relative to the one coupling protrusion.

Two of the levers that extend into the upper section may be provided inside the rotators, and two of the levers that extend into the lower section may be provided outside the rotators.

The first section may be disposed to correspond to a radiator, and the second section may be disposed to correspond to an intercooler.

The two sections may include a third section formed on a right side, and a fourth section formed on a left side, wherein the third and fourth sections may have different areas.

The third section may have an area greater than an area of the fourth section and be disposed to correspond to a radiator, and the fourth section may be disposed to correspond to an intercooler provided with a dual air duct.

A guide may be formed in the duct housing and provided to support the dual air duct.

A length of an air flap disposed in the third section may be greater than that of an air flap disposed in the fourth section.

According to an exemplary embodiment of the present invention, upper and lower sections or left and right sections can be controlled using only one motor in various ways depending on driving conditions of the vehicle wherein it is possible to precisely control the upper and lower sections or the left and right sections despite reducing the production cost due to a reduction in the number of motors, and the fuel efficiency can be enhanced because the weight of the vehicle is reduced.

Furthermore, when a drive device of the heat exchanger cooling system malfunctions, air flaps are allowed to open, wherein at least the minimum cooling area can be secured without separate manipulation. Consequently, ease of use for a driver can be enhanced, and the reliability in performance of the vehicle can be improved.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
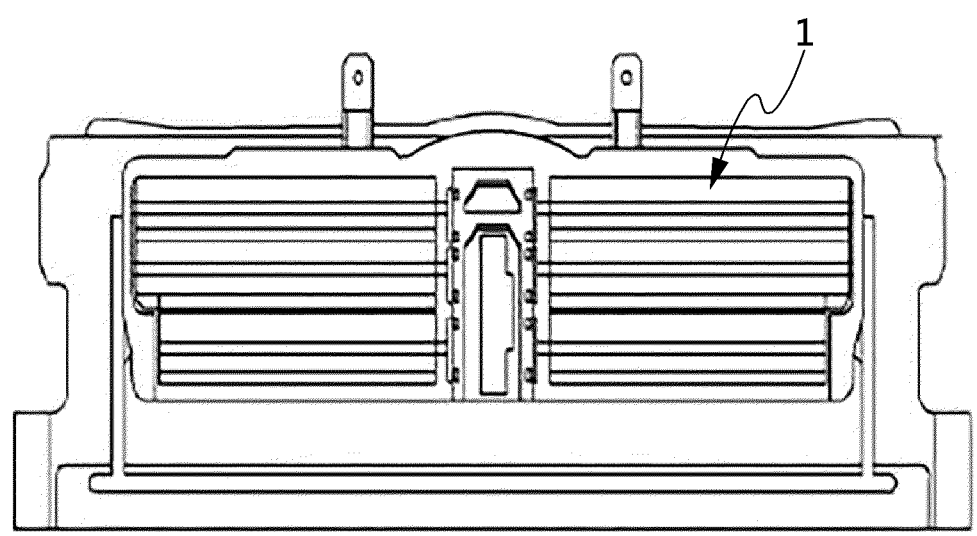
FIG. 1 is a view illustrating an active air flap according to a conventional art.

It should be understood that the appended drawings are not necessarily to scale, presenting a somewhat simplified representation of various features illustrative of the basic principles of the invention. The specific features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s). examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents, and other embodiments, which may be included within the spirit and scope of the invention as defined by the appended claims.

Unless otherwise defined, all terms including technical and scientific terms used herein have the same meaning as commonly understood by one of ordinary skill in the art to which this invention belongs. It will be further understood that terms, including those defined in commonly used dictionaries, should be interpreted as having a meaning that is consistent with their meaning in the context of the relevant art and the present invention, and will not be interpreted in an idealized or overly formal sense unless expressly so defined herein. Specific structural and functional descriptions of embodiments of the present invention disclosed herein are only for illustrative purposes of the exemplary embodiments of the present invention, and the present description is not intended to represent all of the technical spirit of the present invention. It will be understood that, although the terms first, second, etc. may be used herein to describe various elements and distinguish the elements from each other, these elements should not be limited by these terms. [A Heat Exchanger Cooling System According to a First Exemplary Embodiment of the Present Invention]

Figure 2:
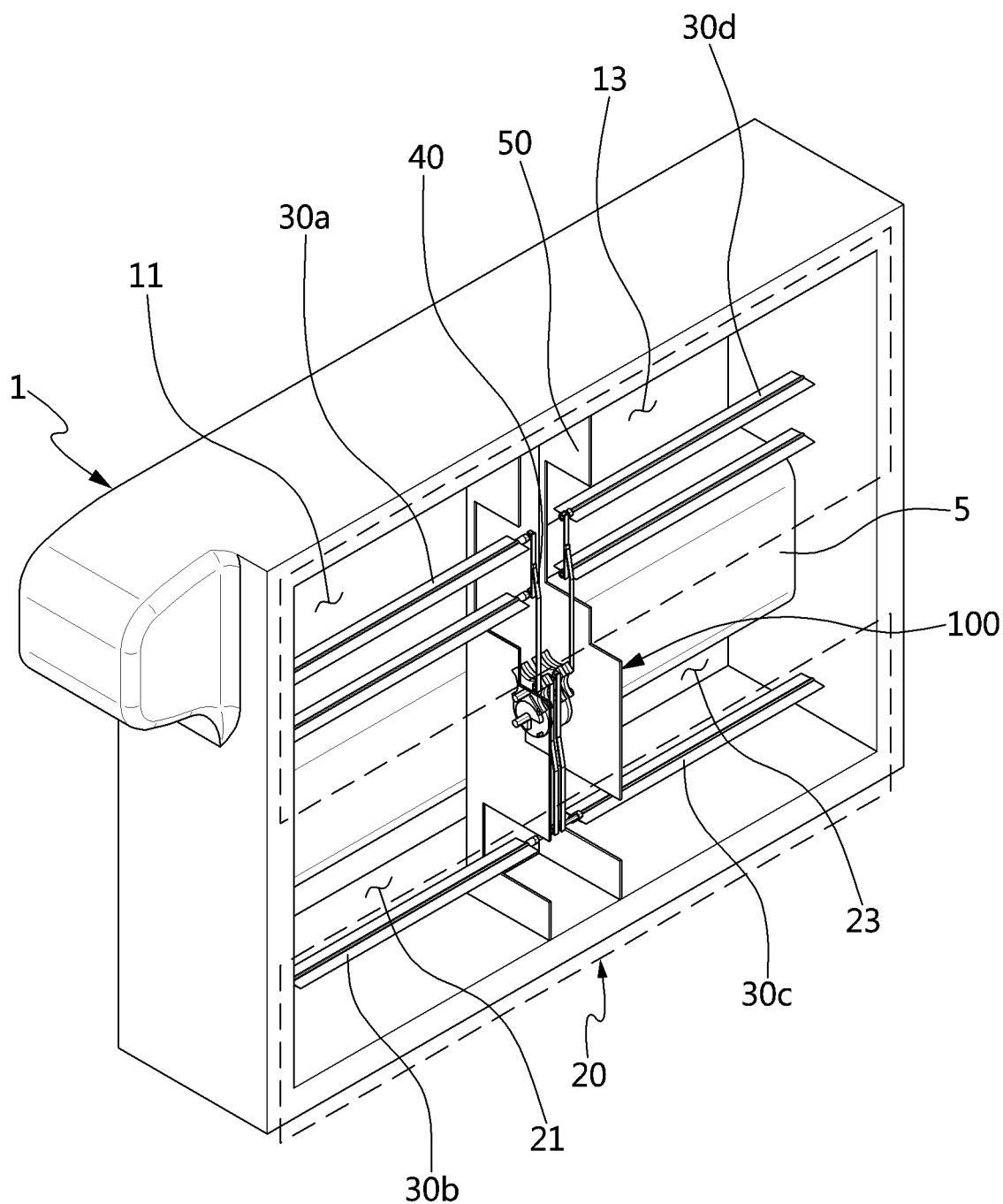
FIG. 2 is a perspective view illustrating the overall shape of a heat exchanger cooling system according to various exemplary embodiments of the present invention.
Figure 3A:
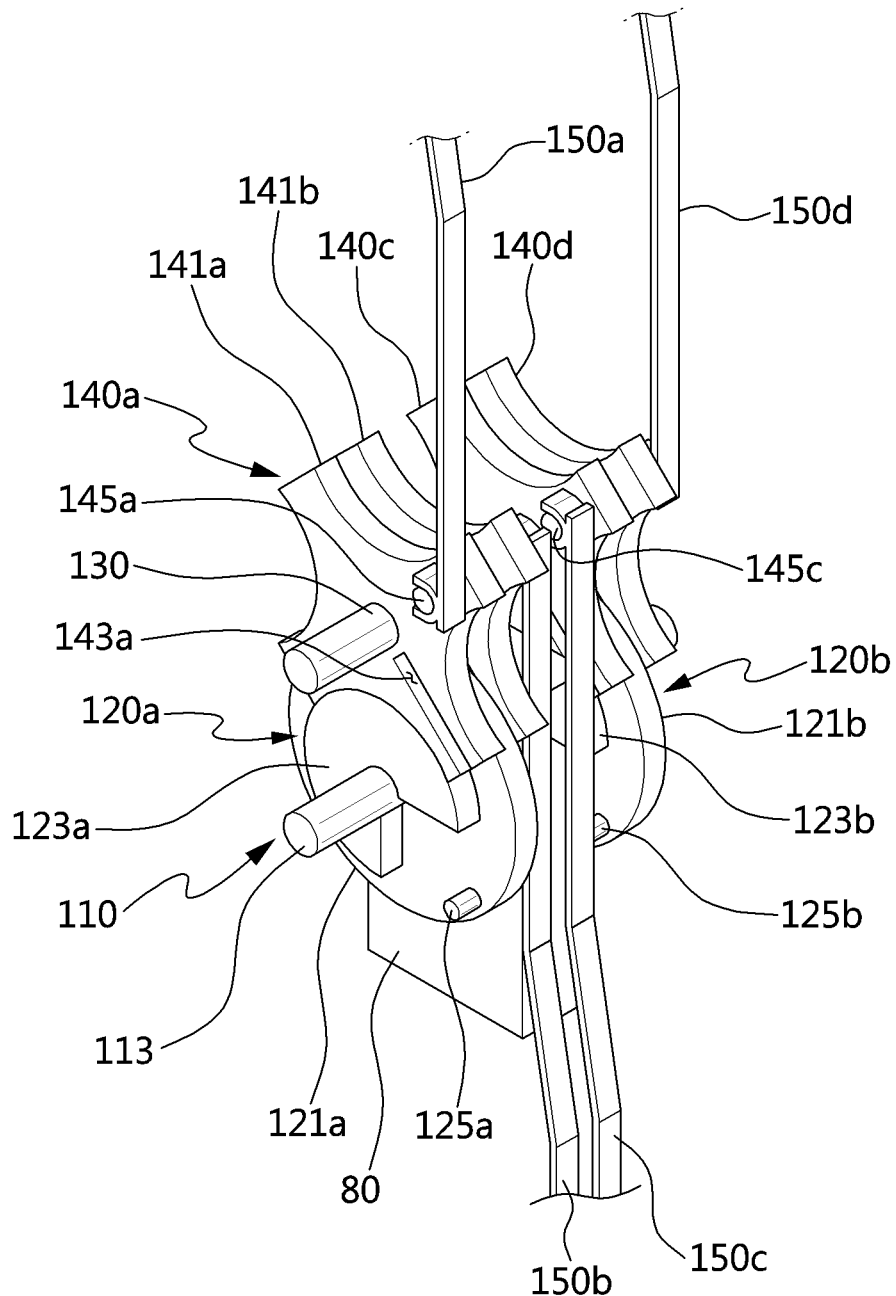
FIG. 3A is a perspective view illustrating a drive device of the heat exchanger cooling system according to the various exemplary embodiments of the present invention.
Figure 3B:
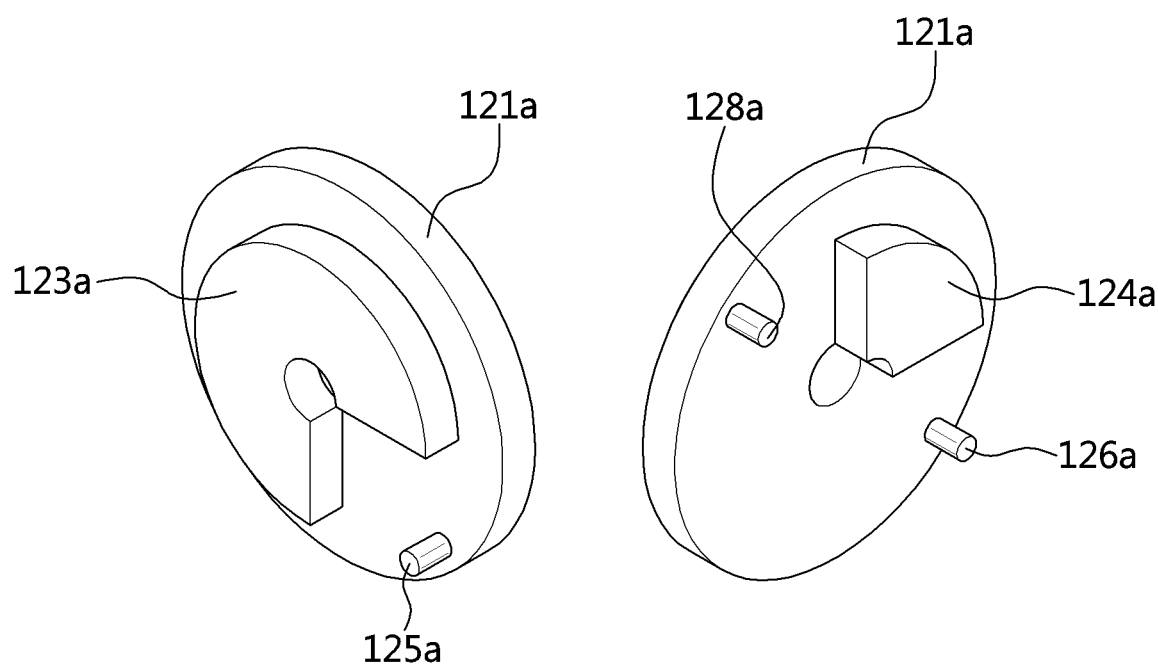
FIG. 3B is a perspective view illustrating a rotator according to the various exemplary embodiments of the present invention.

FIG. 2 is a perspective view illustrating the overall shape of a heat exchanger cooling system according to a first exemplary embodiment of the present invention. FIG. 3A is a perspective view illustrating a drive device of the heat exchanger cooling system according to the first exemplary embodiment of the present invention. FIG. 3B is a perspective view illustrating a rotator according to the first exemplary embodiment of the present invention.

Referring to FIG. 2 to FIG. 3B, the heat exchanger cooling system according to the first exemplary embodiment of the present invention may include a duct housing 1, a partitioning frame 5, a frame 50, a motor 80, and a drive device 100.

The duct housing 1 is fixed in a front-end module of a vehicle. The partitioning frame 5 extending in the left and right direction is provided in a medial portion of the duct housing 1.

The frame 50 is provided in the duct housing 1 in the up and down direction thereof. The drive device 100 is provided in the frame 50.

The region in the duct housing 1 is partitioned, by the partitioning frame 5, into an upper section (11, 13) formed over the partitioning frame 5, and a lower section (21, 23) formed under the partitioning frame 5. Each of the upper section (11, 13) and the lower section (21, 23) is divided into two sub-sections by the frame 50.

The drive device 100 includes levers 150a, 150b, 150c, and 150d which are respectively coupled to air flaps 30a, 30b, 30c, and 30d provided in the respective sub-sections so that each of the air flaps 30a, 30b, 30c, and 30d provided in the respective sub-sections can be rotated by the operation of the drive device 100, wherein each sub-section can be opened or closed.

When each lever moves upward or downward, a guide frame 40 coupled to the lever, a flap rod coupled to the guide frame 40, and the air flap coupled to the flap rod are operated wherein the corresponding sub-section is opened or closed.

The motor 80 is provided on the frame 50 and disposed adjacent to the drive device 100. The motor 80 is configured to provide a driving force to the drive device 100.

The motor 80 according to the first exemplary embodiment is formed of a single motor, and moves the levers 150a, 150b, 150c, and 150d of the drive device 100 upward or downward so that the four sub-sections can be controlled.

The conventional art is problematic in that the production cost and the weight of the product are increased because two motors are used to control two sections formed in a single air duct. To overcome the problem of the conventional art, the present invention utilizes the single motor to control the two sections and the four sub-sections, thus reducing the production cost and the weight of the product.

The drive device 100 is configured to rotate the air flaps and may include a first rotation shaft 110, rotators 120, a second rotation shaft 130, gears 140, and levers 150.

The first rotation shaft 110 is coupled to an output shaft of the motor 80 and configured to rotate along with the motor 80. The first rotation shaft 110 rotates the rotators 120a and 120b.

The rotators 120a and 120b are configured to be rotated by the motor 80. In an exemplary embodiment of the present invention, two rotators 120a and 120b may be provided.

Each of the rotators 120a and 120b may include a rotator body 121a, 121b having a disk shape, and a coupling protrusion and a stopper which are provided on both sides of the rotator body 121a, 121b. The two rotators 120a and 120b according to the present embodiment have the same shape.

The left diagram of FIG. 3B illustrates the shape of one surface of the rotator 120a, and the right diagram thereof illustrates the shape of the other surface of the rotator 120a.

A stopper 123a having a ¾ circular cross-section protrudes from one surface of the rotator 120a. A stopper 124a having a ¼ circular cross-section protrudes from the other surface of the rotator 120a.

Furthermore, coupling protrusions having different phases are provided on the opposite surfaces of the rotator 120a.

More specifically, a coupling protrusion 125a provided on one surface of the rotator 120a is disposed at a position at which the stopper 123a having a ¾ circular cross-section is not formed. Two coupling protrusions 126a and 128a are provided on the other surface of the rotator 120a with a 180°-phase difference, wherein the stopper 124a having a ¼ circular cross-section is provided with a 45°-phase difference relative to each of the coupling protrusions 126a and 128a.

Each of the coupling protrusions is provided in a form of a cylinder which vertically protrudes from the corresponding one of the opposite surfaces of the rotator body 121a, 121b. The coupling protrusions are disposed at positions adjacent to the circumference of the rotator body 121a, 121b.

The coupling protrusions engage with coupling holes 143a, 143b, 143c, and 143d of the gears 140a, 140b, 140c, and 140d and are configured to rotate the gears 140a, 140b, 140c, and 140d.

Each of the coupling protrusions is provided with a difference in phase relative to the first rotation shaft 110.

Thus, the levers 150a, 150b, 150c, and 150d independently move upward or downward in a sequence in which the protrusions engage with the coupling holes of the gears, and thus rotate the corresponding air flaps.

Each of the stoppers 123a and 124a is formed to engage with any one surface of the corresponding gear 140a, 140b, 140c, 140d so that the gear cannot be rotated by the stopper 123a, 124a, and when the corresponding coupling protrusion rotates by a predetermined angle and engages with the coupling hole of the associated gear, the gear can be rotated.

Each gear 140a, 140b, 140c, 140d is configured to rotate when it engages the corresponding coupling protrusion through the coupling hole 143a, 143b, 143c, 143d thereof. The gear 140a, 140b, 140c, 140d transmits the rotational force to the corresponding lever 150a, 150b, 150c, 150d and moves the lever 150a, 150b, 150c, 150d upward or downward.

Each gear 140a, 140b, 140c, 140d may have four surfaces, and each surface is formed of a concave curved surface to allow the corresponding stopper 123a, 124a to be coupled to the gear 140a, 140b, 140c, 140d.

The gears 140a, 140b, 140c, and 140d rotate around the second rotation shaft 130. Each of the gears 140a, 140b, 140c, and 140d is coupled to the corresponding lever by a connection shaft 145a, 145b, 145c, 145d provided at a predetermined position of the gear.

At least one of the levers 150b and 150c that are coupled to the lower air flaps is coupled at a lower end portion thereof with a spring 160 wherein the spring 160 has one end portion fixed to the duct housing 1.

The four sub-sections are controlled by moving the levers 150a, 150b, 150c, and 150d upward or downward. The two levers 150a and 150d that extend into the upper section are provided on the external surfaces of the respective rotators. The two levers 150b and 150c that extend into the lower section are provided on the internal surfaces of the respective rotators.

The sub-section has at least one air flap 30a, 30b, 30c, 30d.

The spring 160 returns the air flap 30b, 30c to its initial position when the corresponding gear is released from the associated rotator body 121a, 121b, so that when the drive device of the heat exchanger cooling system malfunctions, the air flaps are allowed to open, wherein at least the minimum cooling area can be secured without separate manipulation. Consequently, ease of use for a driver can be enhanced, and the reliability in performance of the vehicle can be improved.

Figure 4A:
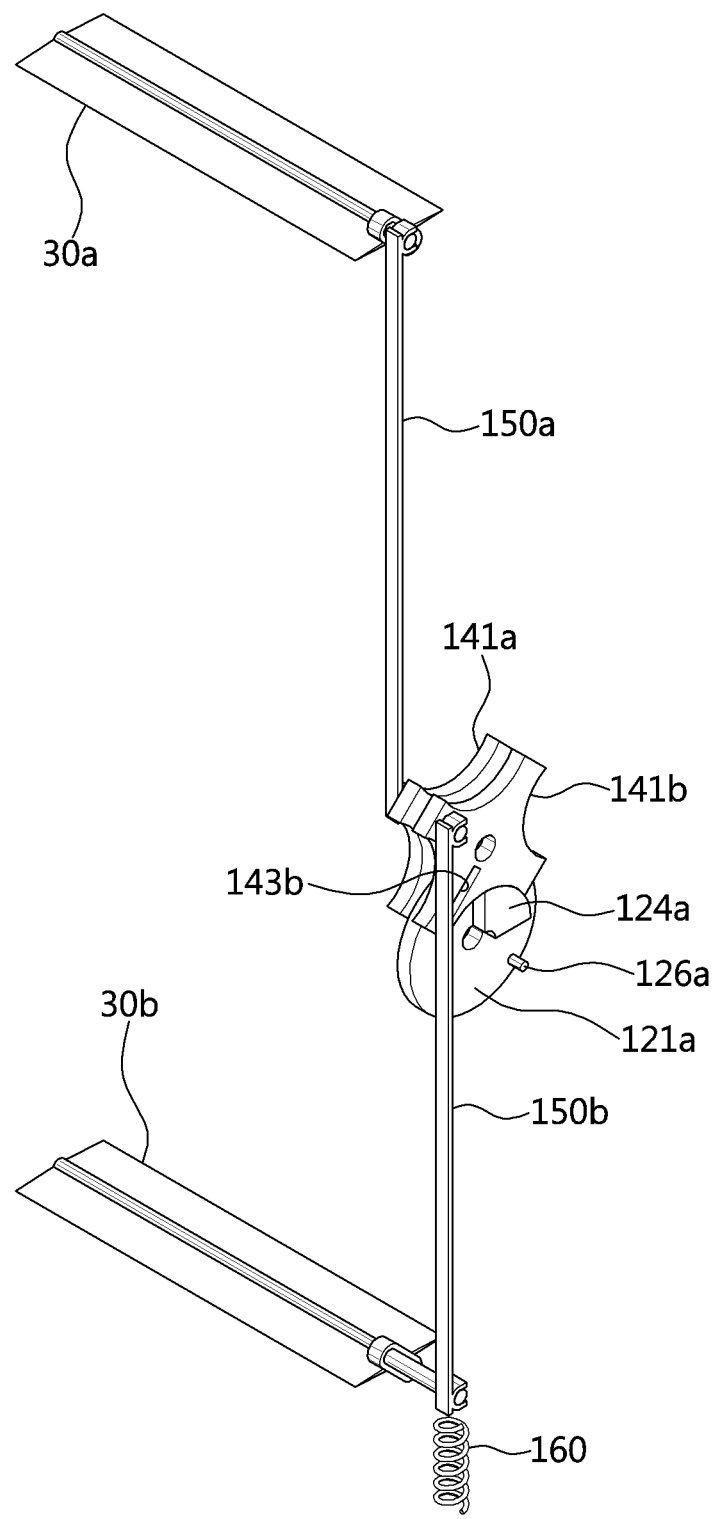
FIG. 4A, FIG. 4B, FIG. 4C, FIG. 4D, FIG. 4E, and FIG. 4F are conceptual views illustrating the operation of the heat exchanger cooling system according to the various exemplary embodiments of the present invention.

FIG. 4A. FIG. 4B, FIG. 4C, FIG. 4D, FIG. 4E, and FIG. 4F are conceptual views illustrating the operation of the heat exchanger cooling system according to the first exemplary embodiment of the present invention.

FIG. 4A illustrates a state in which both the upper section and the lower section are open.

Figure 4B:
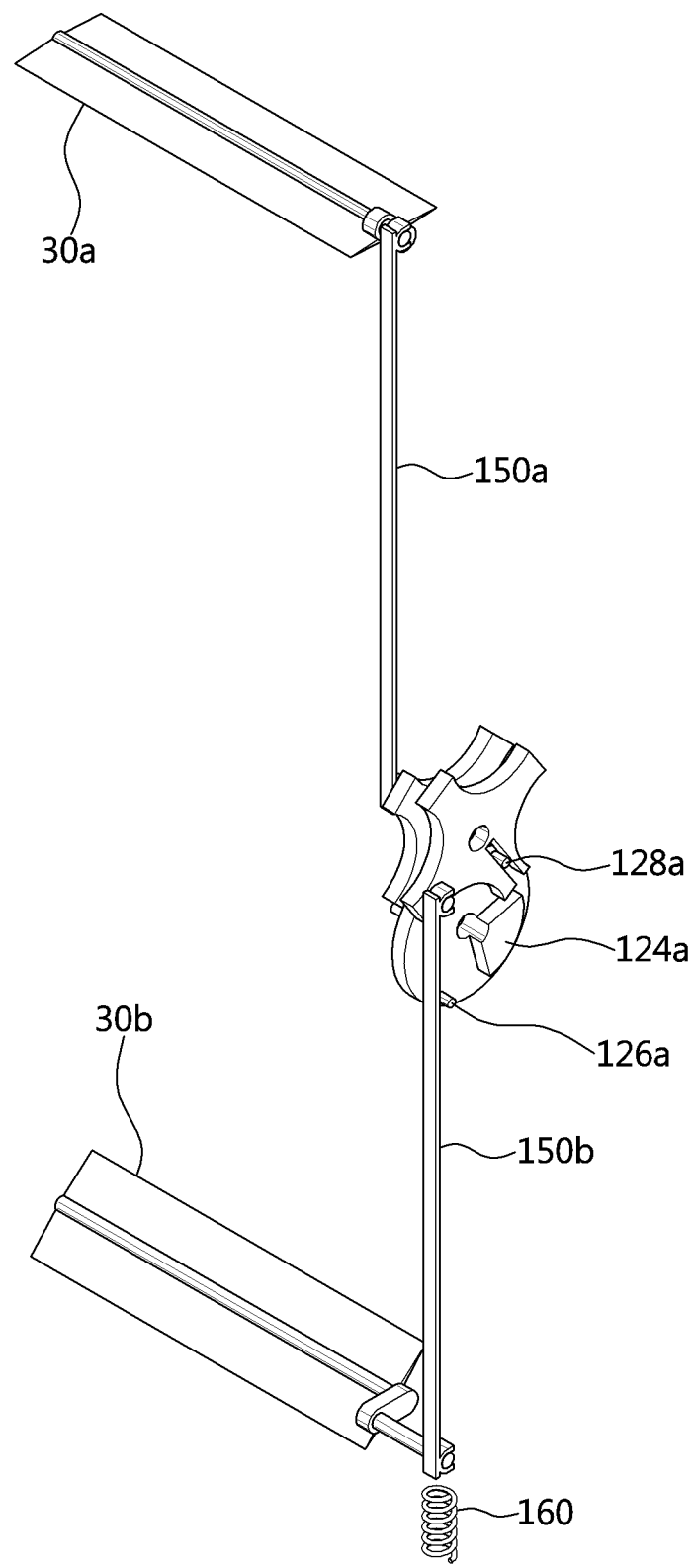

Referring to FIG. 4B, when the motor is rotated in a normal direction, the rotator is also rotated in a normal direction thereof. As such, the coupling protrusion 128a engages with the coupling hole 143b, wherein the gear 141b is rotated, and the lever 150b is moved downward.

As a result, the air flap 30b is rotated by the downward movement of the lever 150b, thus closing, or partially closing, the lower section. In the present case, the spring 160 is compressed by the downward movement of the lever 150b.

Figure 4C:
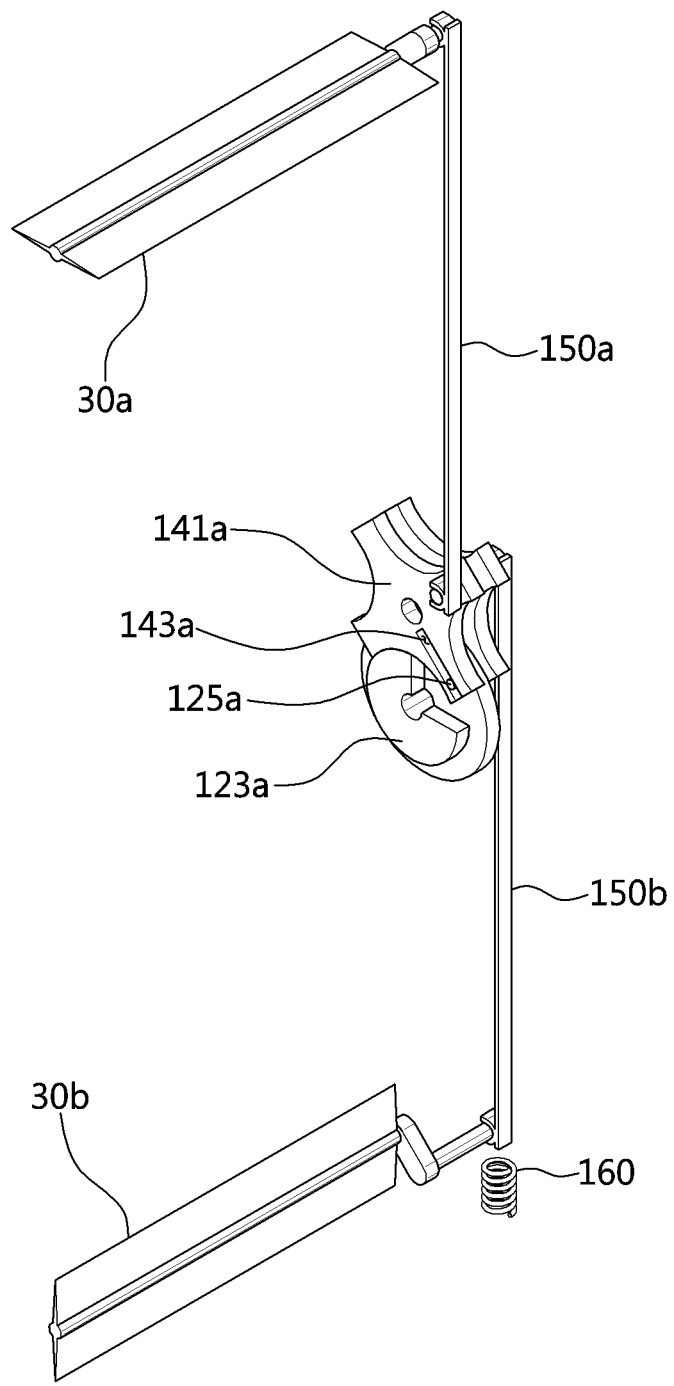

Referring to FIG. 4C, when the rotator 120a is rotated by 90° relative to that of FIG. 4A, the coupling protrusion 128a is released from the coupling hole 143b, and the coupling protrusion 143a engages with the coupling hole 143a. In the present state, the lower section is completely closed, and the upper section is completely open.

Figure 4D:
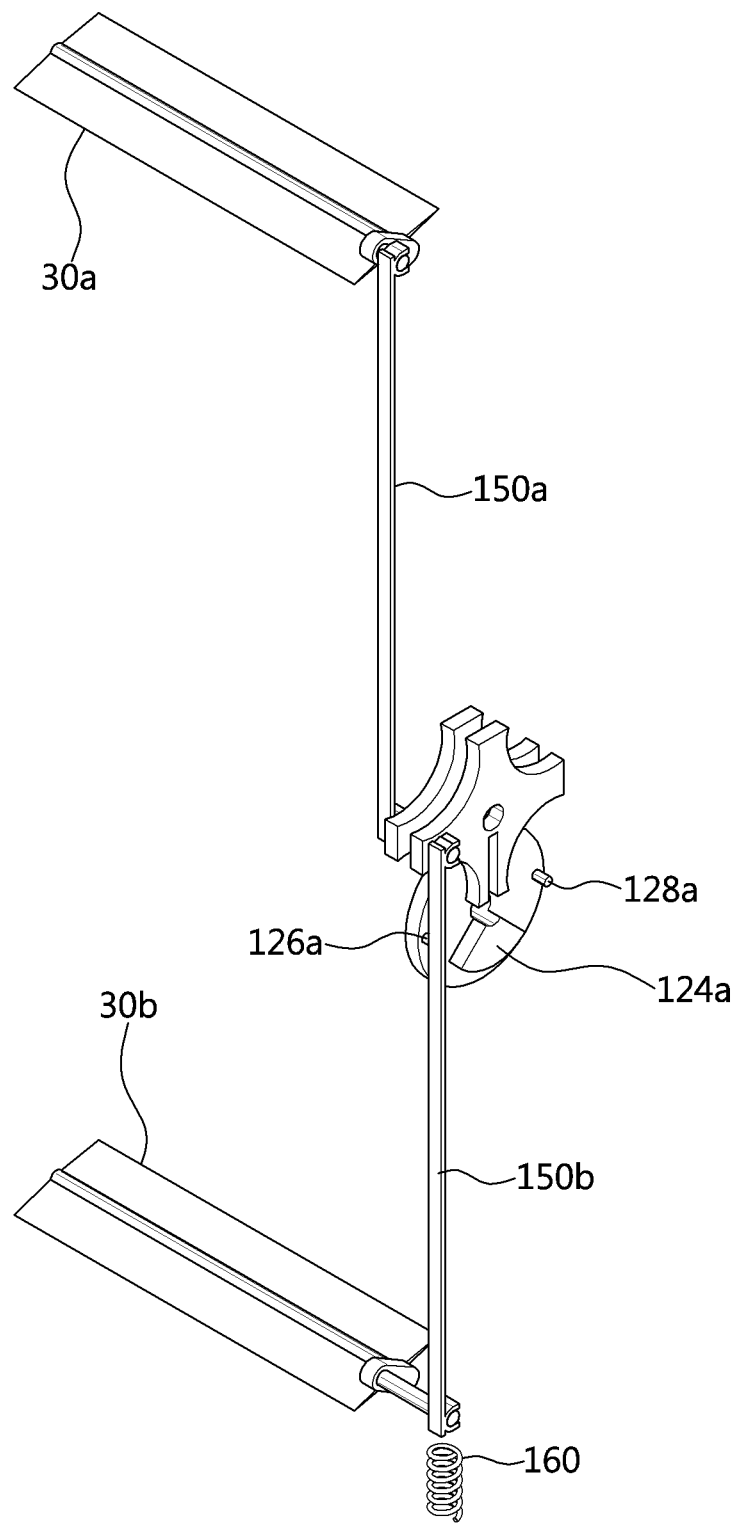

Referring to FIG. 4D, the lever 150b is moved upward by the restoring force of the spring 160, thus opening the lower section. Simultaneously, the coupling protrusion 128a engages with the coupling hole 143a and rotates the gear 141a, thus moving the lever 150a downward. The air flap 30a rotates and begins to close the upper section.

Figure 4E:
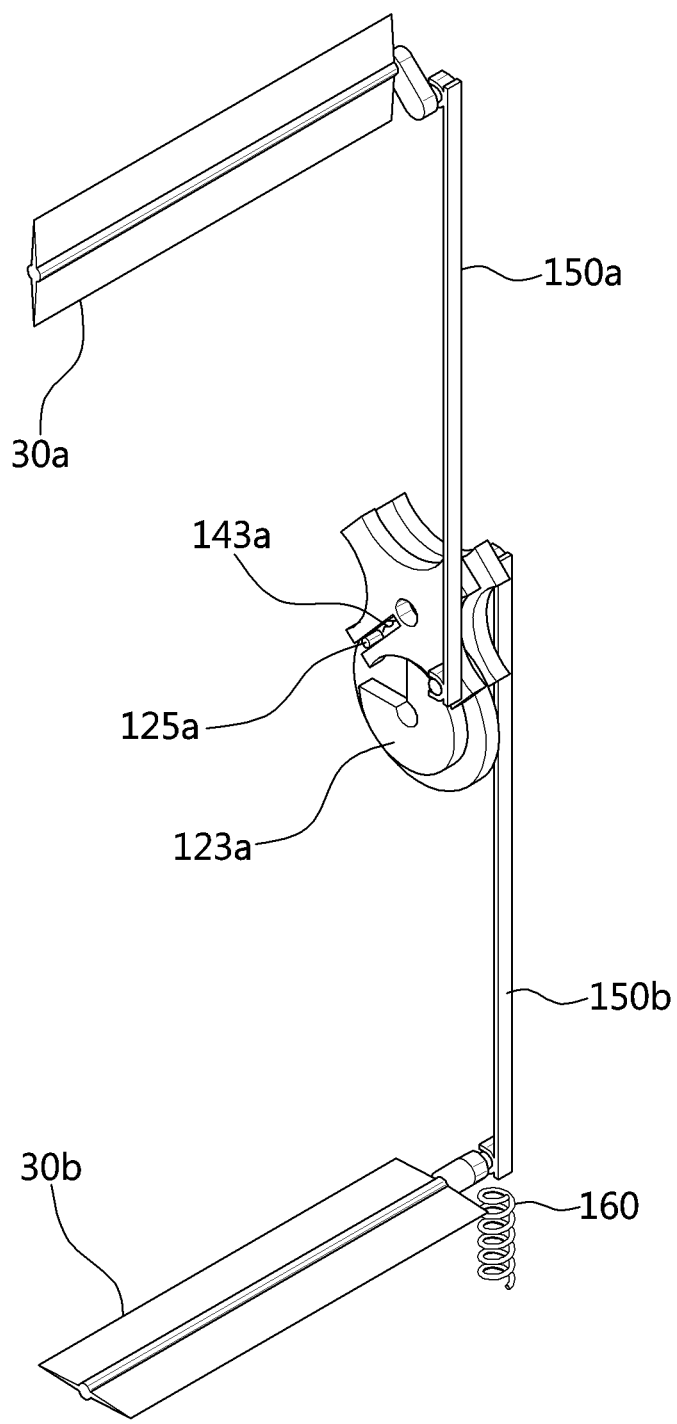

Referring to FIG. 4e, the air flap 30b is rotated so that the lower section is completely opened, and the air flap 30 is rotated so that the upper section is completely closed.

Figure 4F:
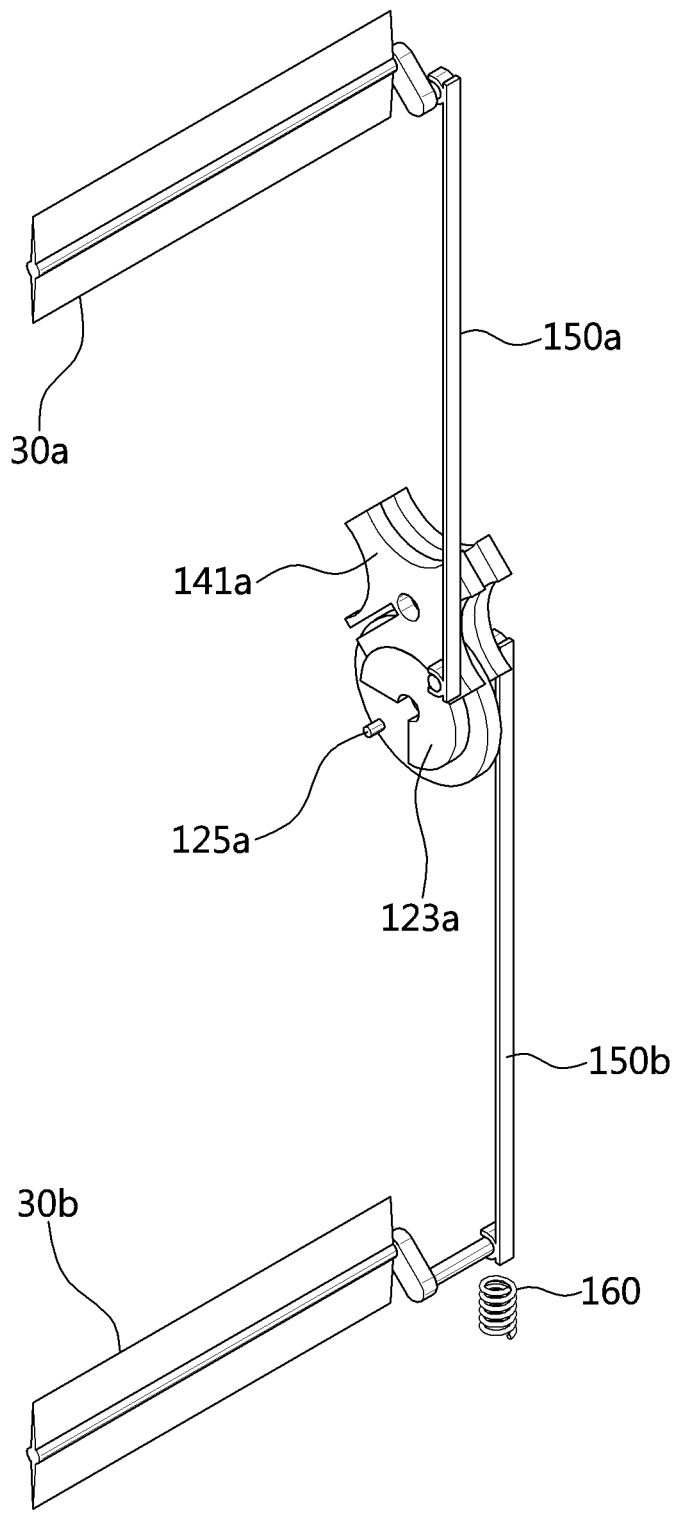

FIG. 4f illustrates a state in which the upper and lower sections are completely closed.

In the heat exchanger cooling system according to the first exemplary embodiment of the present invention, the region in the duct housing 1 is partitioned, by the partitioning frame 5, into the upper section (11, 13) formed over the partitioning frame 5, and the lower section (21, 23) formed under the partitioning frame 5. Each of the upper section (11, 13) and the lower section (21, 23) is divided into two sub-sections by the frame 50.

In an exemplary embodiment of the present invention, a radiator may be disposed at a position corresponding to the upper section (11, 13), and an intercooler may be disposed at a position corresponding to the lower section (21, 23).

Thus, when both the upper section and the lower section are opened by the operation of the single motor, cooling of the engine and the intercooler is optimized, and the operation of a fan is minimized. To prioritize the cooling of the engine, the upper section is opened, and the lower section is closed.

To prioritize the cooling of the intercooler or air-conditioning of the passenger compartment, the upper section is closed, and the lower section is opened. To increase aerodynamic performance and heat, or reduce idle noise, both the upper section and the lower section are closed.

Accordingly, according to an exemplary embodiment of the present invention, the upper and lower sections may be controlled in various ways depending on driving conditions of the vehicle so that it is possible to precisely control the upper and lower sections despite reducing the production cost due to a reduction in the number of motors, and the fuel efficiency can be enhanced because the weight of the vehicle is reduced.

[A Heat Exchanger Cooling System According to a Second Exemplary Embodiment of the Present Invention]

Figure 5:
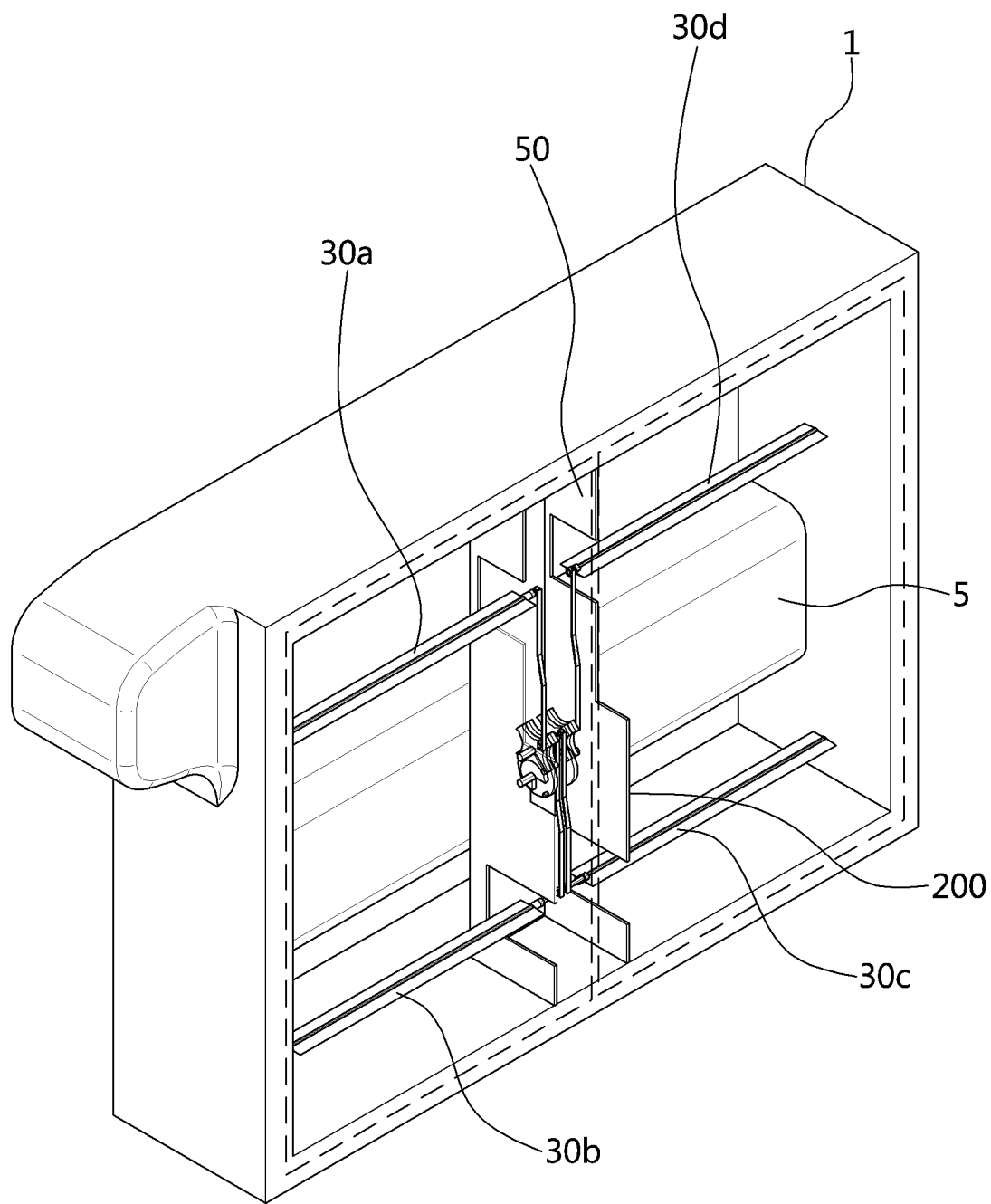
FIG. 5 is a perspective view illustrating the overall shape of a heat exchanger cooling system according to various exemplary embodiments various exemplary embodiments of the present invention.
Figure 6A:
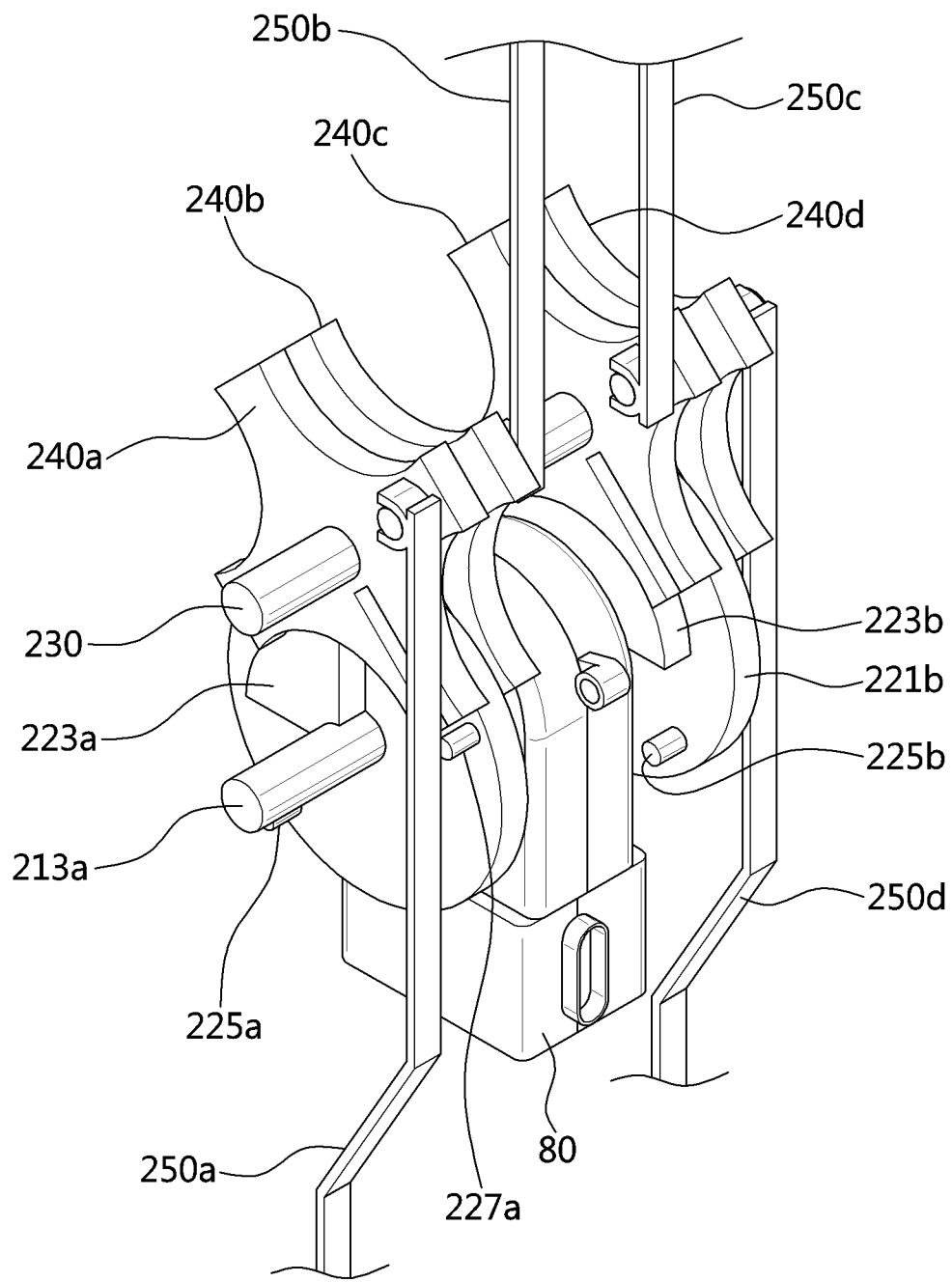
FIG. 6A is a perspective view illustrating a drive device of the heat exchanger cooling system according to the various exemplary embodiments of the present invention.
Figure 6B:
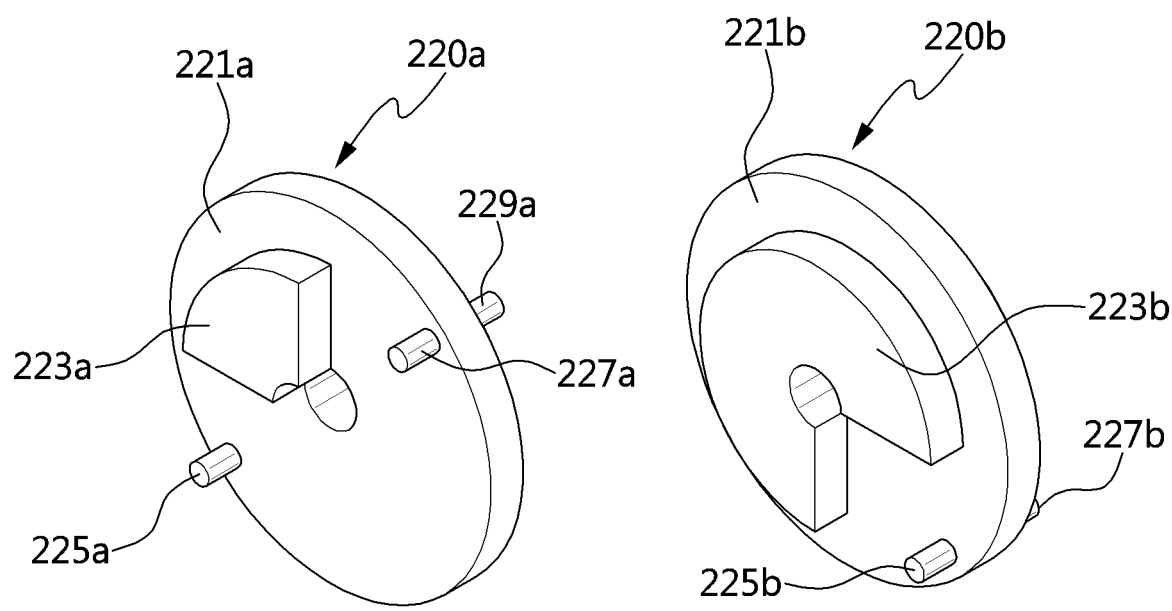
FIG. 6B is a perspective view illustrating a rotator according to the various exemplary embodiments of the present invention.

FIG. 5 is a perspective view illustrating the overall shape of a heat exchanger cooling system according to a second exemplary embodiment of the present invention. FIG. 6A is a perspective view illustrating a drive device of the heat exchanger cooling system according to the second exemplary embodiment of the present invention. FIG. 6B is a perspective view illustrating a rotator according to the second exemplary embodiment of the present invention.

Referring to FIG. 5, FIG. 6A, and FIG. 6B, most general configurations of the heat exchanger cooling system according to the second exemplary embodiment of the present invention is the same as that of the heat exchanger cooling system according to the first exemplary embodiment.

Therefore, like numerals are used to designate like parts, and description of parts different from those of the first exemplary embodiment will be mainly made.

In the heat exchanger cooling system according to the second exemplary embodiment of the present invention, the region in a duct housing 1 is partitioned, by a frame 50, into a first section (13, 23) formed on the right side of the frame 50, and the second section (11, 21) formed on the left side of the frame 50. Each of the first section (13, 23) and the second section (11, 21) is divided into two sub-sections by a partitioning frame 5.

Figure 8:
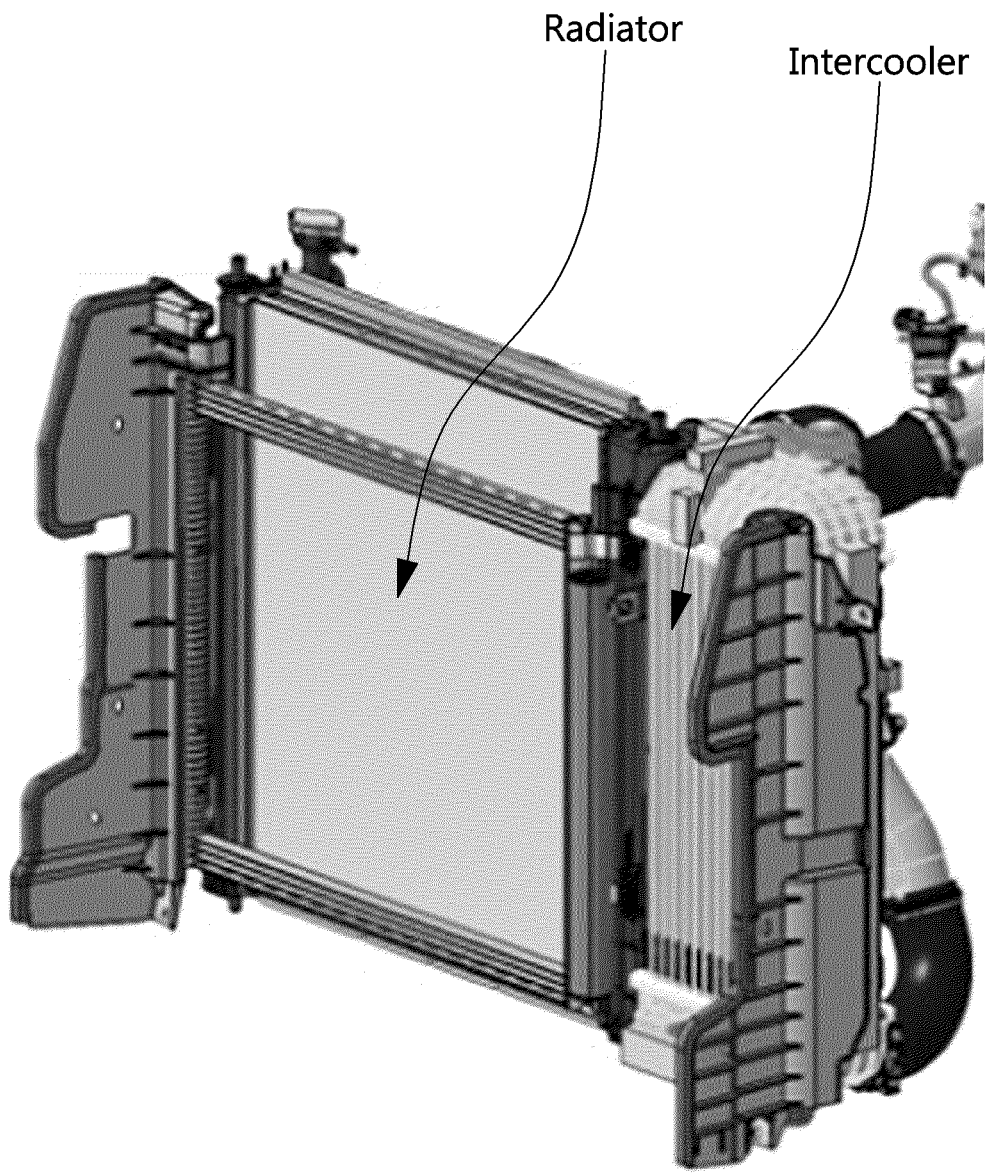
FIG. 8 is a diagram showing an exemplary embodiment of application of the heat exchanger cooling system according to the various exemplary embodiments of the present invention.

The first section (13, 23) and the second section (11, 21) may be formed to have respective areas corresponding to each other. Referring to FIG. 8, the first section (13, 23) is disposed to correspond to the radiator, and the second section (11, 21) is disposed to correspond to the intercooler.

Coupling protrusions and stoppers are disposed on opposite surfaces of each rotator 220a, 220b at positions corresponding to each other. That is, the coupling protrusions and the stoppers of each rotator form a symmetrical structure on the opposite surfaces of each rotator.

The rotator 220a that controls the second section (11, 21) includes, on one surface thereof, two coupling protrusions 225a and 227a which have a phase difference of 180°, and a stopper 223a which has a ¼ circular cross-section and is provided with a phase difference of 45° relative to each of the two coupling protrusions 225a and 227a.

Furthermore, the rotator 220b that controls the first section (13, 23) includes, on one surface thereof, one coupling protrusion 225b, and a stopper 223b which has a ¾ circular cross-section and is provided with a phase difference of 45° relative to the coupling protrusion 225b.

Two levers 250b and 250c that extend into the upper section are provided on internal surfaces of the rotators 220a and 220b. Two levers 250a and 250d that extend into the lower section are provided on external surfaces of the rotators 220a and 220b.

FIG. 7A, FIG. 7B, FIG. 7C, FIG. 7D, FIG. 7E, and FIG. 7F are conceptual views illustrating the operation of the heat exchanger cooling system according to the second exemplary embodiment of the present invention.

Figure 7A:
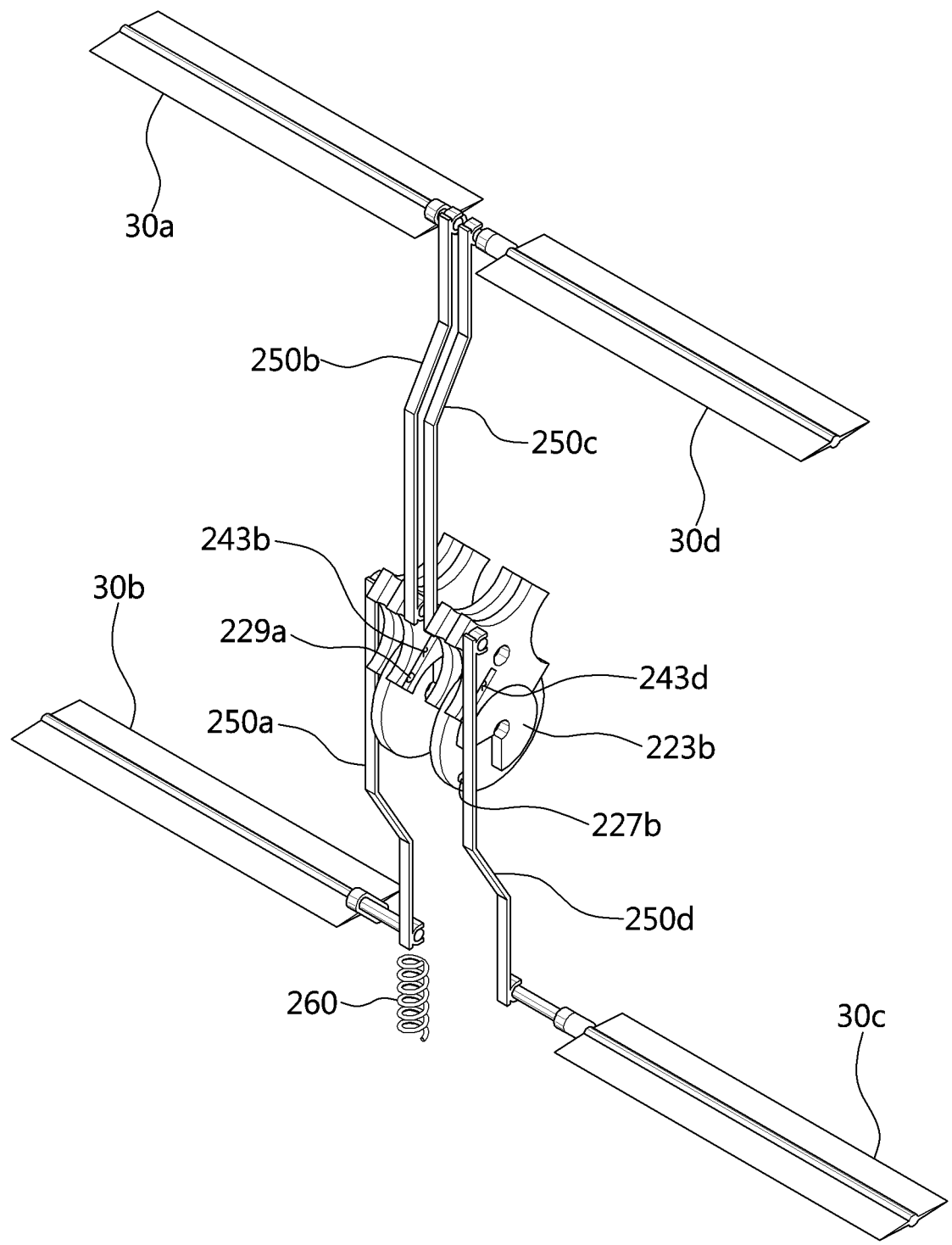
FIG. 7A, FIG. 7B, FIG. 7C, FIG. 7D, FIG. 7E, and FIG. 7F are conceptual views illustrating the operation of the heat exchanger cooling system according to the various exemplary embodiments of the present invention.

Referring to FIG. 7A, both the first section and the second section are in an open state.

In the present case, a spring 260 is provided under a lower end portion of the lever 250a. The coupling protrusions 227a and 229a of the rotator 220a respectively engage with coupling holes 243a and 243b.

Figure 7B:
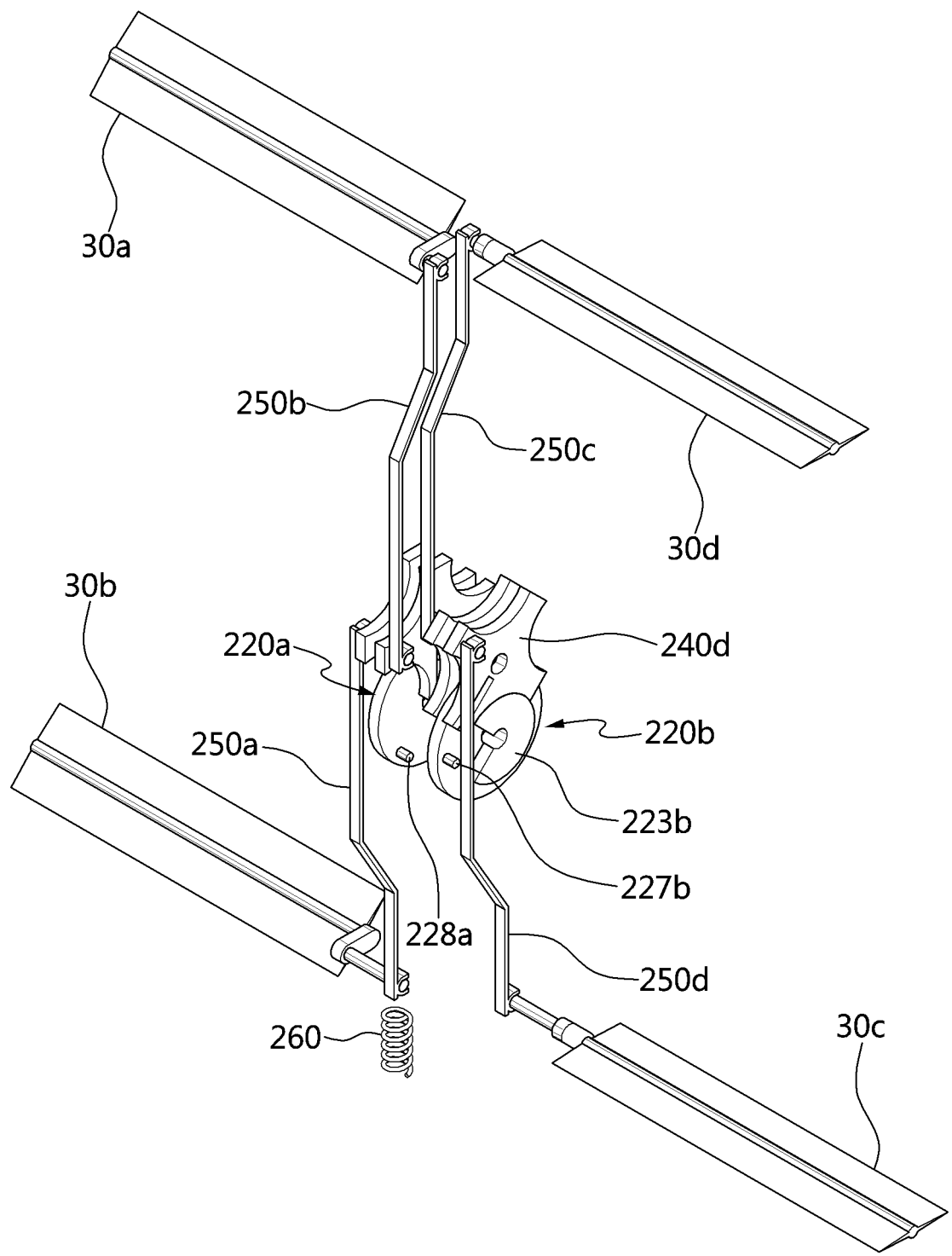

Referring to FIG. 7B, when the motor 80 is operated in a normal direction, air flaps 30a and 30b provided in the second section (11, 21) rotate and begin to close the second section (11, 21). In the present case, although the rotator 220b that controls the first section (13, 23) rotates, the levers 250c and 250d are not moved by the stopper 223b, so that the air flaps 30c and 30d are not rotated.

Figure 7C:
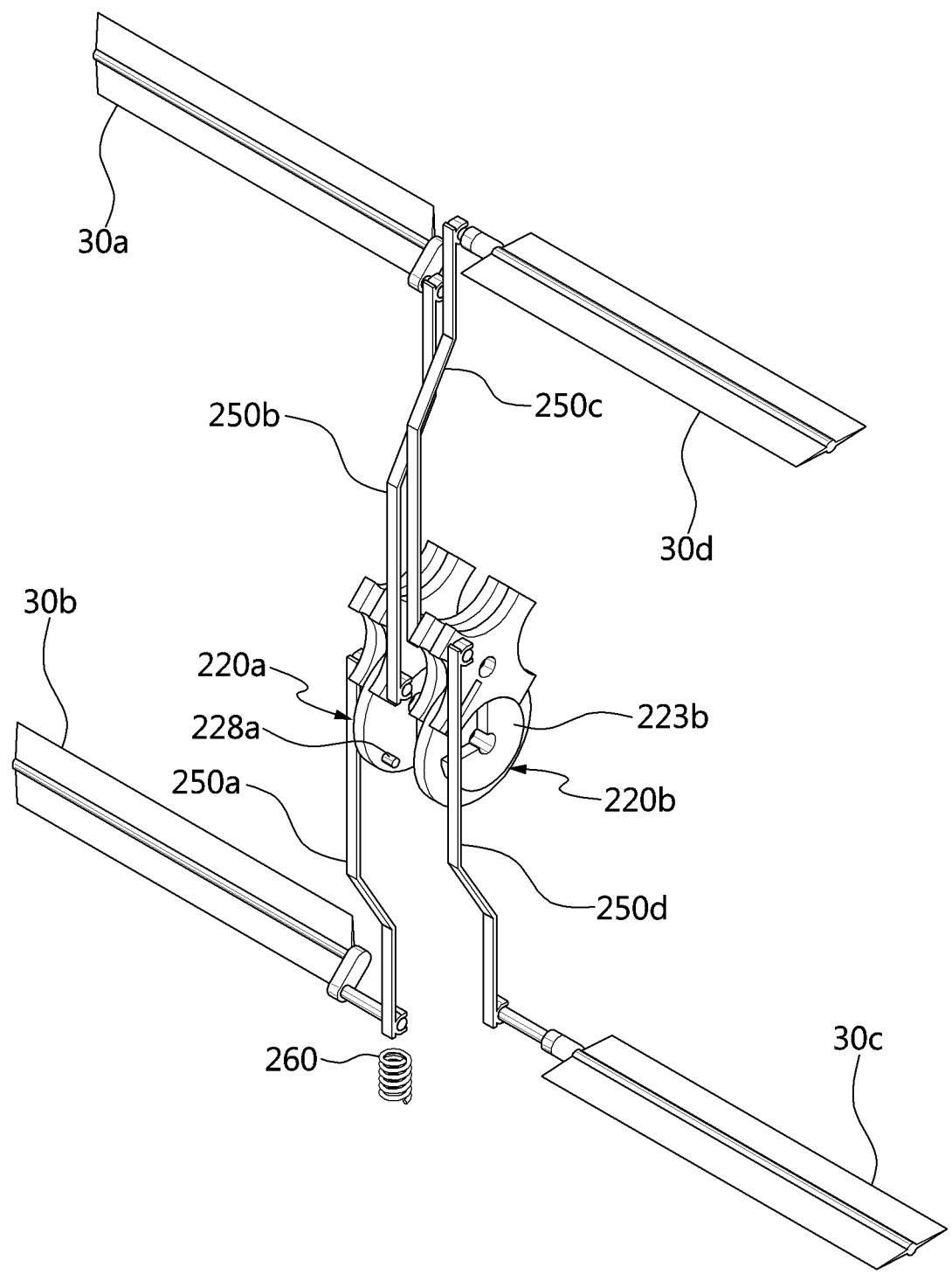

Referring to FIG. 7C, the second section (11, 21) is in a closed state, and the first section (13, 23) is in an open state. In the present case, the coupling protrusions 225b and 227b respectively engage with coupling holes 243c and 243d.

Figure 7D:
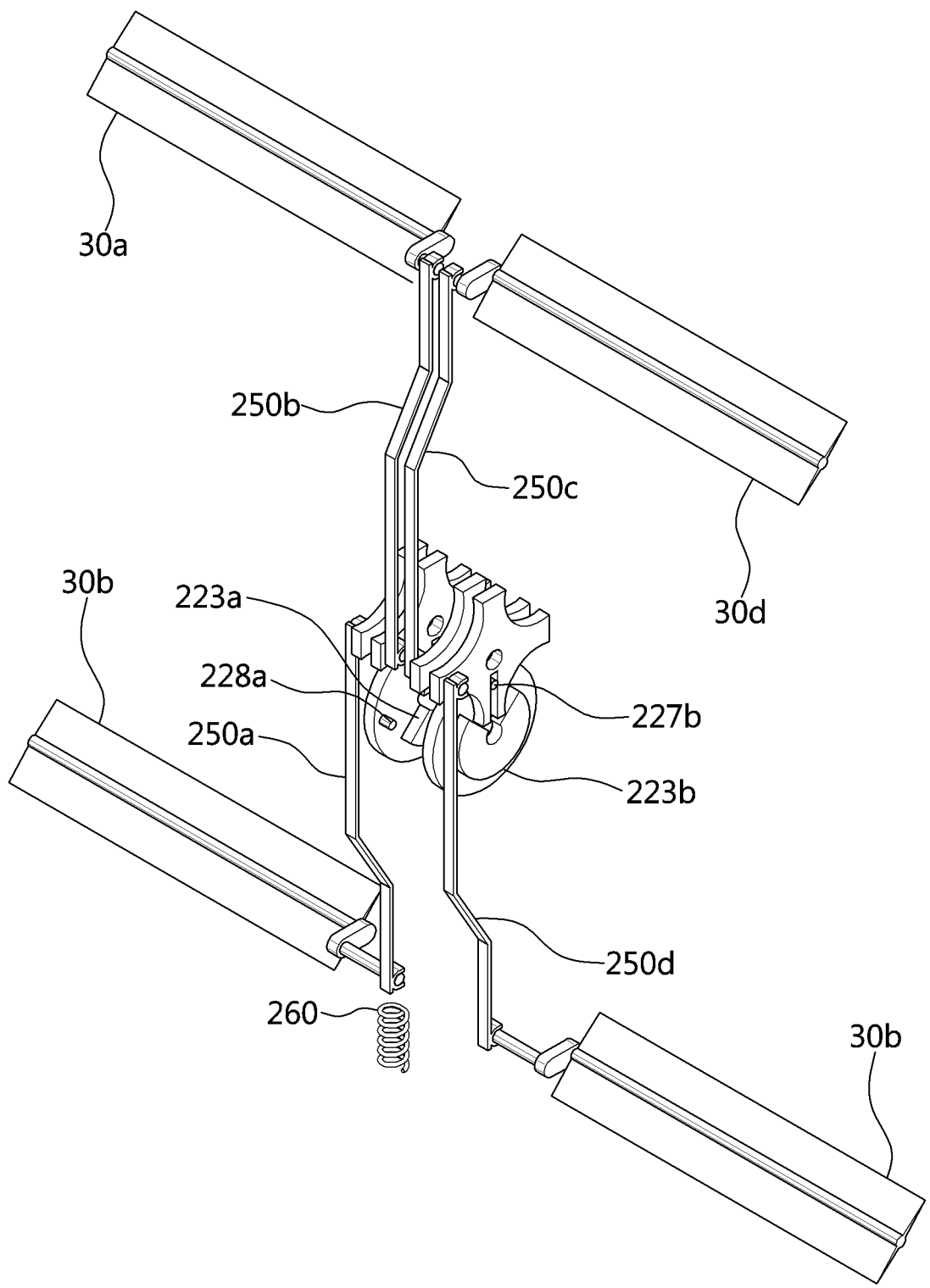

Referring to FIG. 7D, the levers 250a and 250b begin to rotate by the restoring force of the spring 260. Accordingly, the second section (11, 21) begins to open. Furthermore, gears 240c and 240d are rotated by the rotation of the rotator 220b, wherein the air flaps 30b and 30d are rotated, thus beginning to close the first section (13, 23).

Figure 7E:
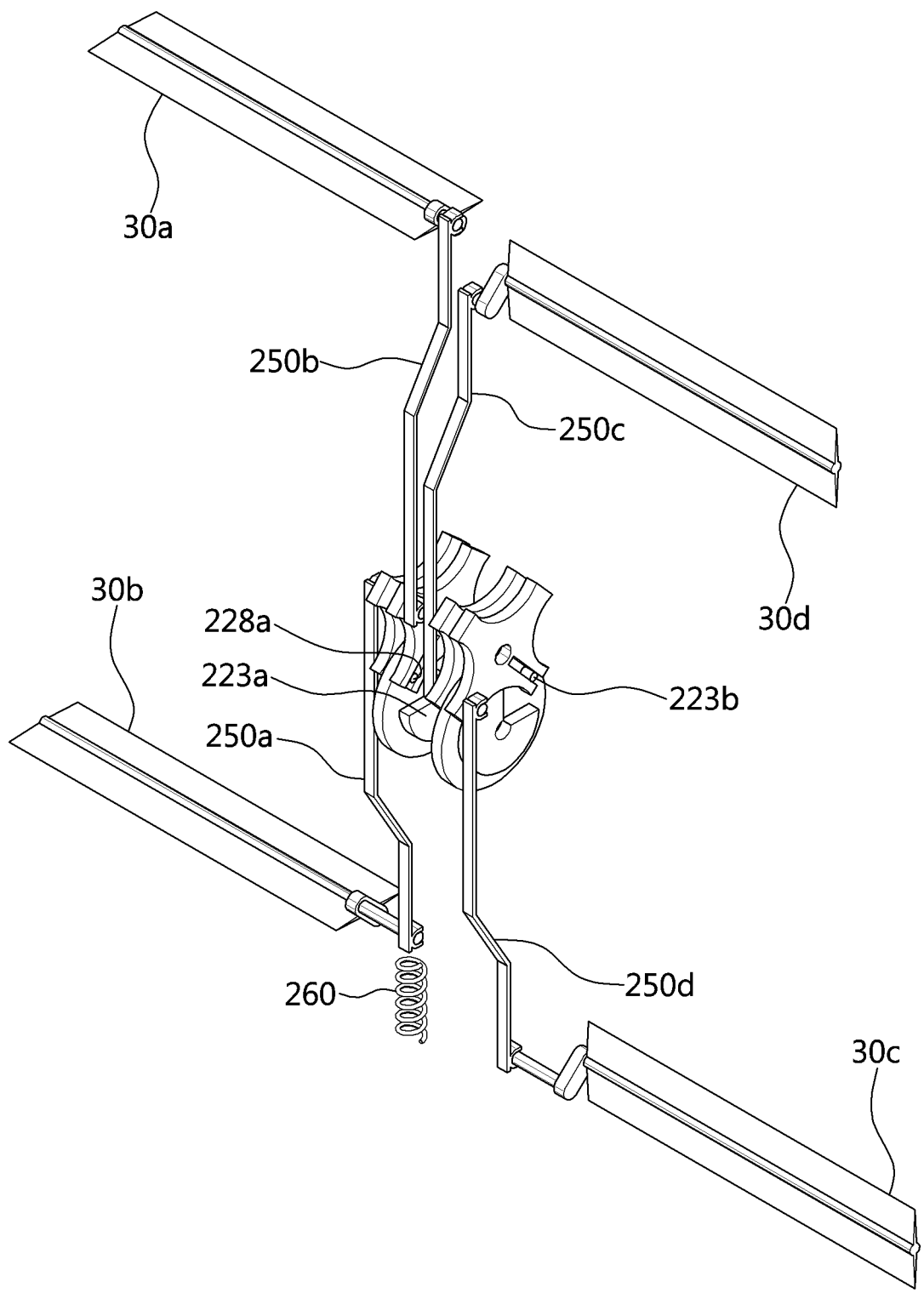

FIG. 7E illustrates a state in which the second section (11, 21) is completely open, and the first section (13, 23) is completely closed.

Figure 7F:
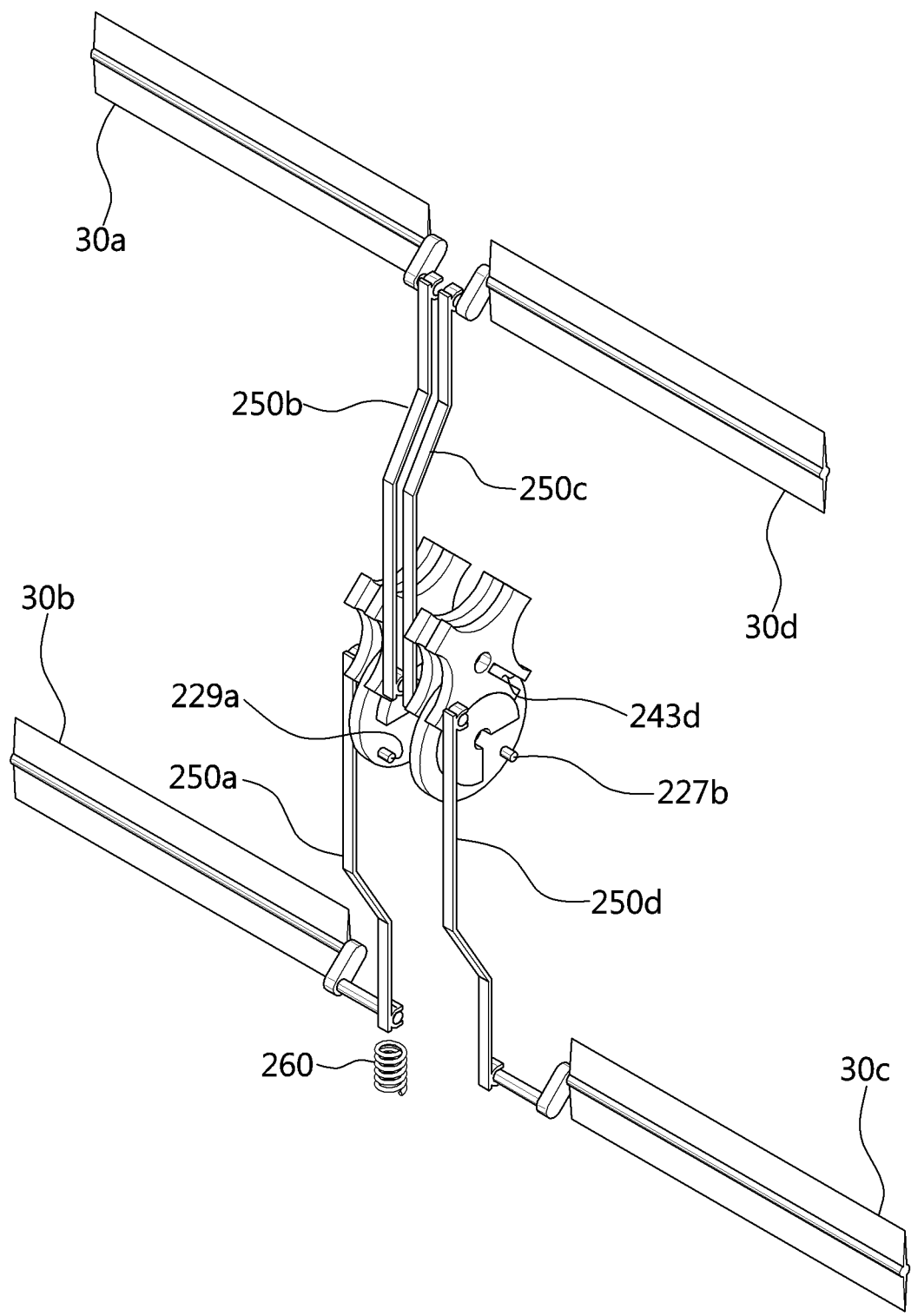

Referring to FIG. 7F, both the first section and the second section are in the closed state.

According to the second exemplary embodiment of the present invention, when both the first section and the second section are opened by the operation of the single motor, cooling of the engine and the intercooler is optimized, and the operation of a fan is minimized. To prioritize the cooling of the engine, the first section is opened, and the second section is closed.

To prioritize cooling of the intercooler or air-conditioning of the passenger compartment, the first section is closed, and the second section is opened. To increase aerodynamic performance and heat or reduce idle noise, both the first section and the second section are closed.

Accordingly, according to the present invention, the first and second sections may be controlled in various ways depending on driving conditions of the vehicle so that it is possible to precisely control the first and second sections despite reducing the production cost due to a reduction in the number of motors, and the fuel efficiency can be enhanced because the weight of the vehicle is reduced.

[A Heat Exchanger Cooling System According to a Third Exemplary Embodiment of the Present Invention]

Figure 9:
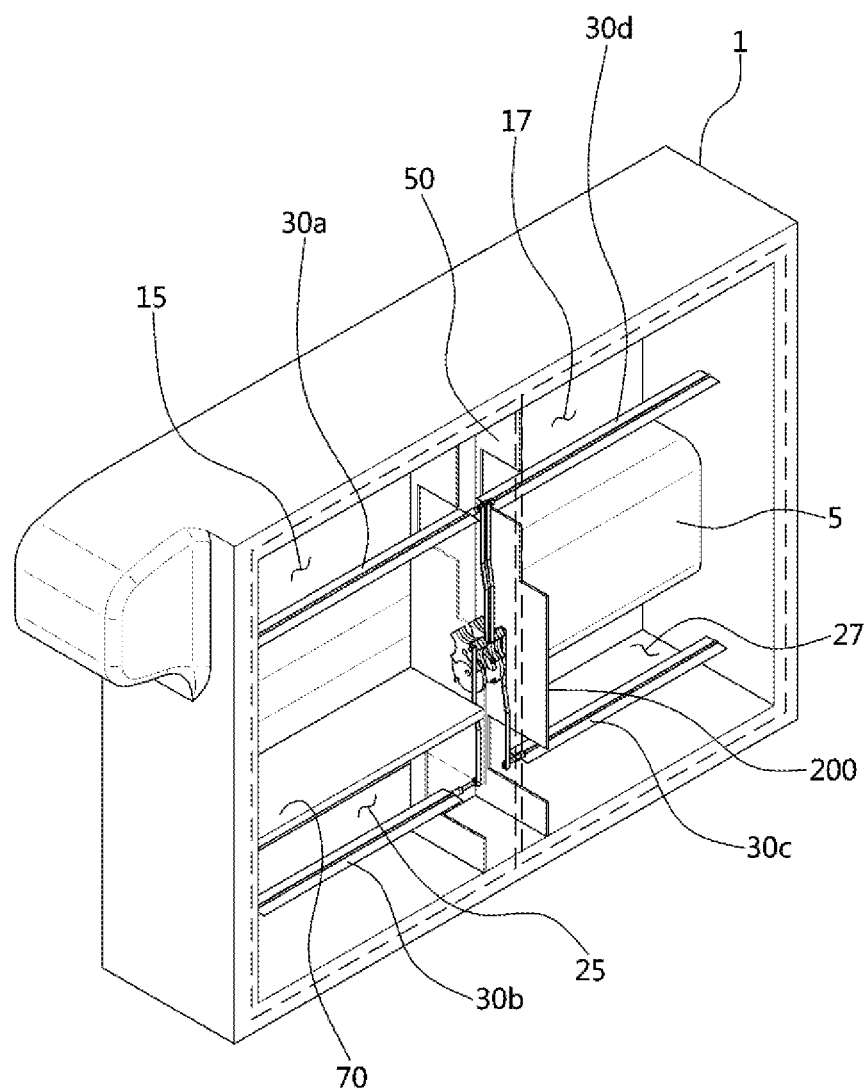
FIG. 9 is a perspective view illustrating the overall shape of a heat exchanger cooling system according to various exemplary embodiments various exemplary embodiments of the present invention.
Figure 10:
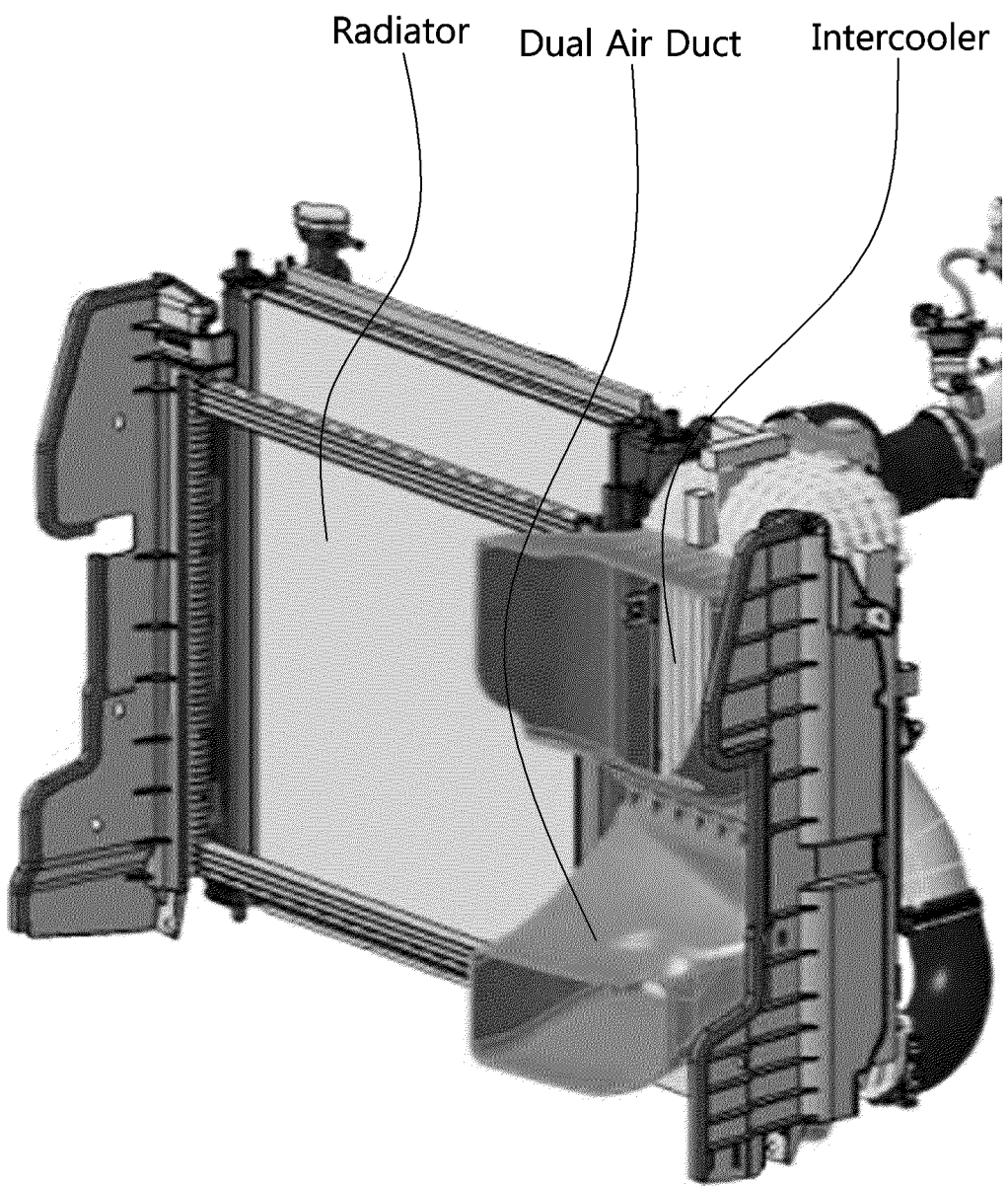
FIG. 10 is a diagram showing an exemplary embodiment of application of the heat exchanger cooling system according to the various exemplary embodiments of the present invention.

FIG. 9 is a perspective view illustrating the overall shape of a heat exchanger cooling system according to a third exemplary embodiment of the present invention. FIG. 10 is a diagram showing an exemplary embodiment of an application of the heat exchanger cooling system according to the third exemplary embodiment of the present invention.

Referring to FIG. 9 and FIG. 10, most general configurations of the heat exchanger cooling system according to the third exemplary embodiment of the present invention is the same as that of the heat exchanger cooling systems according to the other embodiments. Therefore, description of parts different from those of the other embodiments will be mainly made.

In the heat exchanger cooling system according to the third exemplary embodiment of the present invention, the region in a duct housing 1 is partitioned, by a frame 50, into a third section (17, 27) formed on the right side of the frame 50, and the fourth section (15, 25) formed on the left side of the frame 50. Each of the third section (17, 27) and the fourth section (15, 25) is divided into two sub-sections by a partitioning frame 5.

The third section (17, 27) and the fourth section (15, 25) have different areas. The third section may have an area greater than that of the fourth section. The third section (17, 27) is disposed to correspond to the radiator, and the fourth section (15, 25) is disposed to correspond to an intercooler combined with a dual air duct.

Furthermore, air flaps 30d and 30c provided in the third section (17, 27) may be longer than air flaps 30a and 30b provided in the fourth section (15, 25).

A guide 70 for supporting the dual air duct is provided on the portioning frame 5 of the duct housing 1.

Thus, when both the third section and the fourth section are opened by the operation of the single motor, cooling of the engine and the intercooler is optimized, and the operation of a fan is minimized. To prioritize the cooling of the engine, the third section is opened, and the fourth section is closed.

To prioritize cooling of the intercooler or air-conditioning of the passenger compartment, the third section is closed, and the fourth section is opened. To increase aerodynamic performance and heat or reduce idle noise, both the third section and the fourth section are closed.

Accordingly, according to an exemplary embodiment of the present invention, the third and fourth sections may be controlled in various ways depending on driving conditions of the vehicle so that it is possible to precisely control the third and fourth sections despite reducing the production cost due to a reduction in the number of motors, and the fuel efficiency can be enhanced because the weight of the vehicle is reduced.

For convenience in explanation and accurate definition in the appended claims, the terms "upper", "lower", "up", "down", "upwards", "downwards", "internal", "outer", "inside", "outside", "inwardly", "outwardly", "internal", "external", "front", "rear", "back", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A heat exchanger cooling system comprising:
   a frame provided in a duct housing and formed of two sections, each of the two sections being divided into two sub-sections;
   a motor provided in the frame; and
   a drive device configured to be driven by the motor,
   wherein air flaps provided in a respective sub-section are simultaneously controlled by operation of the drive device,
   wherein the drive device includes:
      a plurality of rotators configured to be rotated by the motor;
      a plurality of gears each having a coupling hole at a predetermined position, wherein each gear is configured to be rotated when a corresponding one of coupling protrusions provided on respective opposite surface of each of the rotators engages with the coupling hole of the each gear; and a lever coupled to each of the gears, and wherein each of the gears has four surfaces, and each of the four surfaces includes a concave curved surface.

2. The heat exchanger cooling system of claim 1, wherein the lever is coupled to a corresponding one of the air flaps of a respective sub-section.

3. The heat exchanger cooling system of claim 2, wherein an elastic member is coupled to a lower end portion of at least one of levers coupled to a respective lower air flap, the elastic member being fixed at a first end portion thereof to the duct housing.

4. The heat exchanger cooling system of claim 1, wherein the two sections include two upper and lower sections.

5. The heat exchanger cooling system of claim 4, wherein a stopper having a ¾ circular cross-section is protrudingly formed from a first surface of each rotor of the rotators of the drive device, and a stopper having a ¼ circular cross-section is protrudingly formed from a second surface of the each rotor.

6. The heat exchanger cooling system of claim 5, wherein the coupling protrusions provided on the opposite surface of each of the rotators have different phases.

7. The heat exchanger cooling system of claim 6, wherein one of the coupling protrusions is provided on the first surface of the rotators, and two of the coupling protrusions are provided on the second surface of the rotators with a phase difference of 180° therebetween.

8. The heat exchanger cooling system of claim 4, wherein two of levers that extend into an upper section of the two sections are provided outside the rotators, and two of the levers that extend into a lower section of the two sections are provided inside the rotators.

9. The heat exchanger cooling system of claim 1, wherein the two sections include a first section formed on a first side thereof, and a second section formed on a second side thereof, the first and second sections having areas corresponding to each other.

10. The heat exchanger cooling system of claim 9, wherein coupling protrusions and stoppers provided on each of the rotators are disposed on opposite surfaces of the rotators at positions corresponding to each other.

11. The heat exchanger cooling system of claim 10, wherein two coupling protrusions having a phase difference of 180° relative to each other and a stopper having a ¼ circular cross-section protrude from a first surface of a rotator that pertains to the second section, the stopper having a difference in phase of 45° relative to each of the two coupling protrusions.

12. The heat exchanger cooling system of claim 10, wherein one coupling protrusion and a stopper having a ¾ circular cross-section protrude from a first surface of the rotator that pertains to the first section, the stopper having a difference in phase of 45° relative to the one coupling protrusion.

13. The heat exchanger cooling system of claim 8, wherein two of the levers that extend into the upper section are provided inside the rotators, and two of the levers that extend into the lower section are provided outside the rotators.

14. The heat exchanger cooling system of claim 9, wherein the first section is disposed to correspond to a radiator, and the second section is disposed to correspond to an intercooler.

15. The heat exchanger cooling system of claim 1, wherein the two sections comprise a third section formed on a first side thereof, and a fourth section formed on a second side thereof, the third and fourth sections having different areas.

16. The heat exchanger cooling system of claim 15, wherein the third section has an area greater than an area of the fourth section and is disposed to correspond to a radiator, and the fourth section is disposed to correspond to an intercooler provided with a dual air duct.

17. The heat exchanger cooling system of claim 16, wherein a guide is formed in the duct housing and provided to support the dual air duct.

18. The heat exchanger cooling system of claim 16, wherein a length of an air flap disposed in the third section is greater than a length of an air flap disposed in the fourth section.

* * * * *